United States Patent
Eriksson et al.

(10) Patent No.: US 9,467,258 B2
(45) Date of Patent: Oct. 11, 2016

(54) METHODS AND ARRANGEMENTS FOR SUPPORTING RETRANSMISSION

(75) Inventors: Erik Eriksson, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 24 days.

(21) Appl. No.: 14/404,820

(22) PCT Filed: Jun. 8, 2012

(86) PCT No.: PCT/SE2012/050618
§ 371 (c)(1),
(2), (4) Date: Dec. 1, 2014

(87) PCT Pub. No.: WO2013/184053
PCT Pub. Date: Dec. 12, 2013

(65) Prior Publication Data
US 2015/0155978 A1    Jun. 4, 2015

(51) Int. Cl.
| | | |
|---|---|---|
| *H04L 1/18* | (2006.01) | |
| *H04L 1/00* | (2006.01) | |
| *H04L 5/00* | (2006.01) | |
| *H04B 7/06* | (2006.01) | |
| *H04L 1/16* | (2006.01) | |
| *H04B 7/04* | (2006.01) | |
| *H04B 7/08* | (2006.01) | |
| *H04B 7/02* | (2006.01) | |

(52) U.S. Cl.
CPC .......... *H04L 1/1887* (2013.01); *H04L 1/0026* (2013.01); *H04L 1/1671* (2013.01); *H04L 5/0053* (2013.01); *H04B 7/024* (2013.01); *H04B 7/0413* (2013.01); *H04B 7/0608* (2013.01); *H04B 7/0632* (2013.01); *H04B 7/0814* (2013.01); *H04L 1/1607* (2013.01); *H04L 1/1825* (2013.01); *H04L 1/1838* (2013.01); *H04L 1/1854* (2013.01); *H04L 1/1864* (2013.01)

(58) Field of Classification Search
None
See application file for complete search history.

(56) References Cited

U.S. PATENT DOCUMENTS

| | | | |
|---|---|---|---|
| 6,289,054 B1 * | 9/2001 | Rhee ........................ | H04B 1/66 375/240.12 |
| 9,271,265 B2 * | 2/2016 | Lee ......................... | H04W 72/04 |
| 2008/0002790 A1 * | 1/2008 | Itoh ........................ | H04L 1/0003 375/317 |
| 2008/0137689 A1 * | 6/2008 | Shiizaki ................ | H04L 47/283 370/498 |

(Continued)

FOREIGN PATENT DOCUMENTS

| | | |
|---|---|---|
| EP | 1 903 747 | 3/2008 |
| EP | 2 061 174 | 5/2009 |

OTHER PUBLICATIONS

International Search Report for International application No. PCT/SE2012/050618, Feb. 12, 2013.

(Continued)

*Primary Examiner* — Andrew Oh
(74) *Attorney, Agent, or Firm* — Baker Botts, LLP

(57) ABSTRACT

The herein suggested technology gives principles for how HARQ-feedback, or corresponding, can be predicted using distributed data from scheduling decisions and optionally also from radio measurements. This data can be sent between base stations after the finished scheduling, and does not require a backhaul with very low latency. The predicted HARQ feedback can then be used for scheduling a retransmission or new transmission sooner than the actual HARQ feedback is received.

19 Claims, 10 Drawing Sheets

(56) References Cited

U.S. PATENT DOCUMENTS

| | | | | |
|---|---|---|---|---|
| 2010/0220608 A1* | 9/2010 | Skillermark | H04B 7/0417 | 370/252 |
| 2010/0246472 A1* | 9/2010 | Wu | H04L 1/1812 | 370/315 |
| 2010/0278121 A1* | 11/2010 | Chun | H04L 1/1887 | 370/329 |
| 2011/0002365 A1* | 1/2011 | Khayrallah | H04B 1/71072 | 375/148 |
| 2011/0183692 A1* | 7/2011 | Lee | H04B 17/345 | 455/501 |
| 2011/0269406 A1* | 11/2011 | Aminaka | H04W 24/10 | 455/67.11 |
| 2011/0286538 A1* | 11/2011 | Gunnarsson | H04L 1/1607 | 375/259 |
| 2012/0120806 A1* | 5/2012 | Jeon | H04W 28/08 | 370/235 |
| 2012/0190378 A1* | 7/2012 | Han | H04B 7/0639 | 455/452.2 |
| 2012/0202512 A1* | 8/2012 | Braithwaite | H04W 52/267 | 455/452.2 |
| 2013/0142054 A1* | 6/2013 | Ahmadi | H04B 7/024 | 370/252 |
| 2013/0223501 A1* | 8/2013 | Kalyanasundaram | H04L 1/1829 | 375/227 |
| 2013/0265916 A1* | 10/2013 | Zhu | H04W 72/1226 | 370/280 |
| 2014/0071952 A1* | 3/2014 | Kim | H04L 5/001 | 370/335 |
| 2014/0105150 A1* | 4/2014 | Kim | H04B 7/0417 | 370/329 |
| 2014/0126501 A1* | 5/2014 | Pan | H04L 5/0032 | 370/329 |
| 2014/0226575 A1* | 8/2014 | Davydov | H04W 52/04 | 370/329 |
| 2014/0293889 A1* | 10/2014 | Mahr | H04L 1/1825 | 370/329 |

OTHER PUBLICATIONS

PCT Written Opinion of the International Searching Authority for International application No. PCT/SE2012/050618, Feb. 4, 2013.

* cited by examiner

METHODS AND ARRANGEMENTS FOR SUPPORTING RETRANSMISSION

PRIORITY

This nonprovisional application is a U.S. National Stage Filing under 35 U.S.C. §371 of International Patent Application Serial No. PCT/SE2012/050618, filed Jun. 8, 2012 and entitled "Methods and Arrangements for Supporting Retransmission."

TECHNICAL FIELD

The suggested technology relates to retransmission in a wireless communication system.

BACKGROUND

Many modern cellular communication systems such as HSPA (High Speed Packet Access) and LTE (Long Term Evolution) use automatic link adaptation to achieve efficient communication under varying transmission conditions. The effective bitrate is varied quickly, along with related transmission parameters such as code rate and modulation scheme, depending on predicted radio conditions. When the radio conditions get worse, e.g. at increased interference, the bitrate is decreased to reduce the probability of decoding error. Correspondingly, when the conditions improves, e.g. at decreased interference, the bitrate is increased to increase the transmission efficiency without causing a too high error probability. The radio conditions are often predicted based on past measurements of the radio channel.

Another key technology in these systems is HARQ (Hybrid Automatic Repeat reQuest). With HARQ, failure to decode a received transport block results in a retransmission, possibly with a different redundancy version.

In the simplest version of HARQ, Type I HARQ, both error detecting and FEC (Forward Error Correcting) information is added to each message prior to transmission. When a coded data block is received, the receiver first decodes the error-correction code. If the channel quality is good enough, all transmission errors should be correctable, and the receiver can obtain the correct data block. If the channel quality is bad, and not all transmission errors can be corrected, the receiver will detect this situation using the error-detection code, then the received coded data block is rejected and a retransmission is requested by the receiver, similar to ARQ (Automatic Repeat Request).

In a more sophisticated form of HARQ, Type II HARQ, the message originator may, when a first transmission is received error free, exclude the FEC parity bits from consecutive transmissions. Further, information from two consecutive transmissions comprising errors can be combined by a receiver, thereby enabling deriving of an error free transmission result without having received an error-free transmission.

When a receiver fails in its attempt to decode a transport block, it typically stores the received signal, or a processed version thereof, and combines it with a later received signal being a retransmission of that block. This is known as soft combining, and greatly increases the probability of a correct decoding. Variants of soft combining are Chase combining and incremental redundancy.

In many HARQ protocols, the receiver sends a HARQ feedback after each decoding attempt, in the form of a positive or negative acknowledgement (ACK/NACK), to indicate whether the particular transport block was correctly decoded or not. In case a NACK is sent, the transmitter typically retransmits the transport block. In the case of an ACK, the transmitter can instead use its resources to transmit new data, to the same or a different user.

An alternative HARQ protocol arrangement is to let the receiver control the transmissions, as is done on the LTE uplink. The receiver sends a grant for each requested transmission, indicating among other things the transport format, e.g. modulation and code rate, and whether a retransmission or an original transmission is requested. A grant for a retransmission may in some cases consist of a single bit, similar to a HARQ ACK/NACK, but may in other cases be a complete grant of the same size as a grant for an original transmission. With this view, transmission grants can be seen as a kind of HARQ feedback; this is the view we take in this document.

When applying the different variants of HARQ described above, the receiver must perform a complete decoding attempt before it can decide upon its next action, e.g. sending an ACK or a NACK. Modern error-correcting codes, such as Turbo codes, are very complex to decode, resulting in long delays from transmission until a feedback message can be sent back to the transmitter. This results in long round-trip delays of the HARQ retransmissions. For LTE, the minimum round-trip delay is 8 ms (LTE Frequency Division Duplexing).

Because of the nature of radio channels, and the behavior of interference from other transmitters, it is difficult to make an accurate prediction of the radio conditions for a particular transmission. This makes it necessary to apply a significant margin against sudden variations, to keep the probability of decoding error acceptably low. Such a margin reduces the average throughput.

A higher average throughput can theoretically be achieved by using a higher original transmission bitrate and accepting a higher error probability. The problem with this approach is that it results in much longer packet delays, since each retransmission adds one round trip time, 8 ms in LTE FDD, to the total transmission time of the packet.

HARQ with soft combining can be viewed as a kind of implicit link adaptation mechanism. This is the case if the bitrate is chosen so high that one or more retransmissions are often needed. The effective bitrate of the entire transmission of a transport block then depends on the number of transmissions, including original and retransmissions, as well as transport format parameters such as modulation and coderate. Contrary to link adaptation based on past measurements, the effective bitrate of such a HARQ transmission is determined by the radio conditions during the actual transmission of the transport block.

The problems with the current HARQ solutions are manyfold. The HARQ-roundtrip time limits the performance and also gives strict scheduling timing requirements for retransmissions. Further, as we move towards more and more diverse implementations with carrier aggregation, HetNet deployments, self backhauling and machine to machine communication etc, a need for HARQ-less operation can arise e.g. because of complexity of implementation of HARQ-operation.

SUMMARY

The herein suggested technology gives principles for how HARQ-feedback, or corresponding, can be predicted using distributed data from scheduling decisions and optionally also from radio measurements. This data can be sent between base stations (BSs) after the finished scheduling, and does not require a backhaul with very low latency. The predicted HARQ feedback can then be used for scheduling a retransmission or new transmission sooner than the actual feedback is received.

An advantage of herein suggested technology is that latency may be improved by achieving faster retransmissions, e.g. in HetNet applications involving different serving BSs in uplink and downlink. Bitrates may also be improved. Further, "implicit HARQ" may be achieved for UEs incapable of transmitting HARQ-feedback.

According to a first aspect, a method is provided, which is to be performed by a network node A. The provided method is suitable for supporting retransmission in a wireless communication system comprising a user equipment, UE, which is scheduled, by a base station, BS, C, for communication in a radio resource R. The method comprises receiving information on scheduling decisions associated with the radio resource R from at least one BS. The method further comprises estimating the interference to the communication of the UE in radio resource R, based on said information. Further, it is predicted whether a retransmission of the UE communication is required, based on the estimated interference and a predetermined criterion.

According to a second aspect, a method is provided, which is to be performed by a BS B. The method is suitable for supporting retransmission in a wireless communication system comprising a user equipment, UE being scheduled, by a BS C, for communication in a radio resource R, and further comprising a network node A according to the third aspect below. The method comprises providing information on scheduling decisions made by the BS B to the network node A, thus enabling the network node A to estimate an interference to the communication of the UE in radio resource R based on said information; and further to predict whether a retransmission of the UE communication is required, based on the estimated interference and a predetermined criterion.

According to a third aspect, a network node A is provided, which is operable in a wireless communication system comprising a UE, which is scheduled, by a BS C, for communication in a radio resource R. The network node A comprises a receiver adapted to receive information on scheduling decisions associated with the radio resource R from at least one BS. The network node A further comprises an estimating unit, adapted to estimate the interference to the communication of the UE in radio resource R based on said information. The network node A further comprises a predicting unit, adapted to predict whether a retransmission of the UE communication is required, based on the estimated interference and a predetermined criterion.

According to a fourth aspect, a BS B is provided, which is operable in a wireless communication system comprising a UE being scheduled, by a BS C, for communication in a radio resource R, the communication system further comprising a network node A according to the third aspect. The BS B comprises a providing unit, adapted to provide information on scheduling decisions made by the BS B to the network node A, thus enabling the network node A to estimate an interference to the communication of the UE in radio resource R based on said information; and further to predict whether a retransmission of the UE communication is required, based on the estimated interference and a predetermined criterion.

The above methods, network node A and BS B may be implemented in different embodiments. For example, additional information could be received from one or more BSs by network node A, and correspondingly be provided by BS B. Such information could then be used, in addition to the scheduling information, for estimating of the interference.

Further, the method in network node A could comprise determining a decoding success probability for the UE communication based on the estimated interference, which success probability could be used for the prediction together with a predetermined criterion. The determining of the decoding success probability may involve estimating a signal to interference and noise ratio, SINR, for the UE communication in radio resource R; and mapping said SINR to a success probability using tabulated decoder performance. The predetermined criterion may involve a SINR threshold value and/or a BLER threshold value, representing a breakpoint between decoding success and decoding failure. The network node A may be the BS which schedules the UE in question, which herein is denoted "BS C". When the prediction indicates that a retransmission is required, such a retransmission of the UE communication may be scheduled, before an actual feedback result is received, indicating whether any decoding attempts of the UE communication have been successful or not.

The embodiments above have mainly been described in terms of a method. However, the description above is also intended to embrace embodiments of the decoder and encoder, configured to enable the performance of the above described features. The different features of the exemplary embodiments above may be combined in different ways according to need, requirements or preference

BRIEF DESCRIPTION OF THE DRAWINGS

The invention will now be described in more detail by means of exemplifying embodiments and with reference to the accompanying drawings, in which.

DETAILED DESCRIPTION

The technology suggested herein can be implemented in a number of ways, which may represent different backhaul usage in terms of bandwidth. Depending on the bandwidth that is available and/or to be used, all or parts of the information mentioned herein can be signaled between nodes, such as e.g. base stations (BSs), in the network. For example, each BS in a network may continuously signal information to, for example, a central database, such as e.g. in Centralized RAN, where many BSs are collocated at a central location and only the radio is located at, or close to, the antenna location; or to all the relevant BSs; or broadcasted to all listening base stations or other entities of relevance. Here a relevant entity should be interpreted as any entity used to implement functions as described herein.

Herein, the term "User Equipment", or "UE", will be used as a general term for all types of user devices capable of wireless communication in a communication system. Examples of UEs are e.g. smart phones, cellular phones, tablets and computers. Alternative terms for "UE" could be e.g. "mobile terminal" or "user device". The term "Base Station" or "BS" will be used as a general term for network nodes operable to communicate wirelessly with UEs in a communication system. Examples of BSs are e.g. eNodeB/eNB in LTE-type systems, NodeB and RNC in UMTS-type systems. An alternative term for BS could be e.g. "Radio Base Station", "RBS", or "radio access node". The term "network node" will be used as a general term representing e.g. BSs in the radio access network, but also representing nodes in the core network, such as operation and management nodes.

Figure 1A:
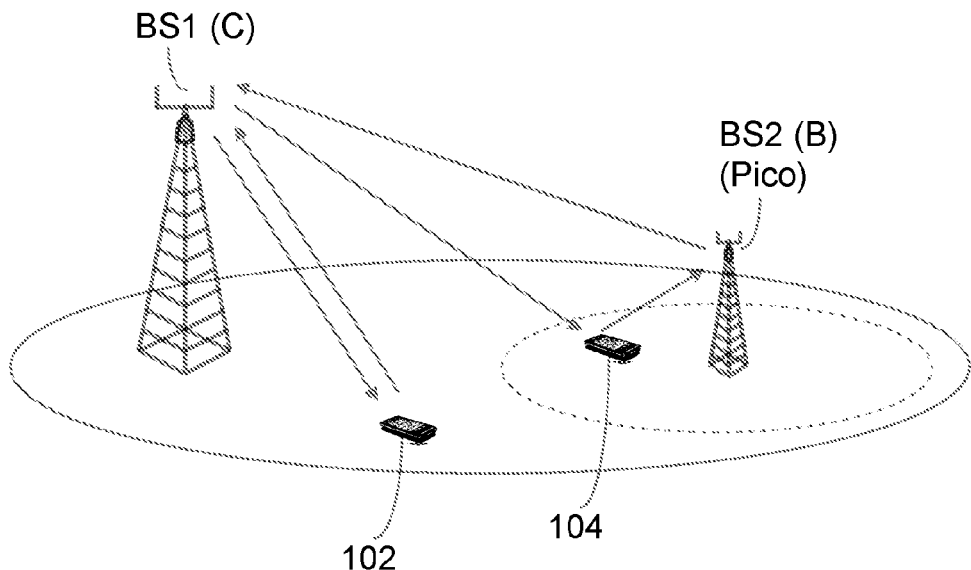
FIG. 1a illustrates a situation in a communication network where a user equipment (UE) 104 is served by different BSs in the downlink and in the uplink.
Figure 1B:
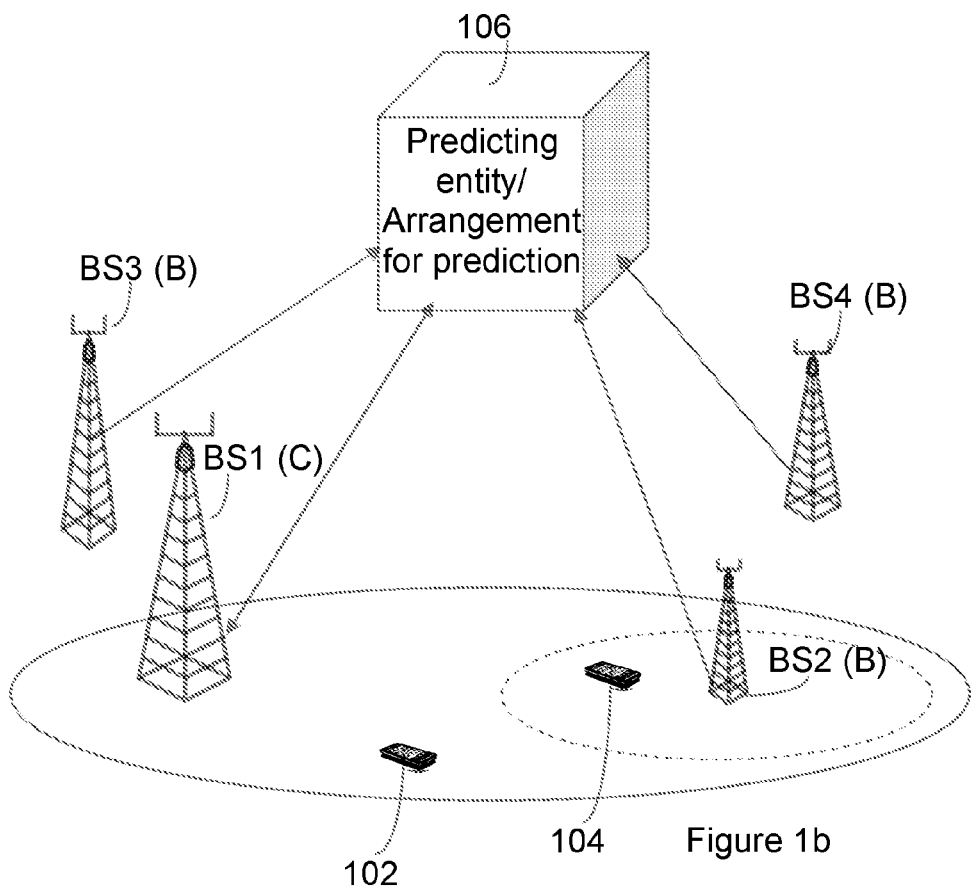
FIG. 1b illustrates communication between base stations and an arrangement for prediction 106, according to an exemplifying embodiment. The arrangement 106 may also be denoted predicting entity, and may be located in a BS or other network node.

In FIG. 1 b, a wireless communication system is exemplified, comprising BSs and UEs. FIG. 1b also shows a predicting entity or an arrangement for prediction 106, which communicates with the BSs. The predicting entity 106 is illustrated in FIG. 1 b as located in a separate entity or node, but the functionality provided by the predicting entity 106 could be located in a BS, e.g. in a macro BS1

Each BS may signal for each TTI, but not necessarily in each TTI, all or parts of the scheduling decisions for the scheduled TTI, such that for each resource block RB, the UE information signaled can be paired with a scheduling decision for the RB by, for example, using an unique id for each UE. The scheduling decision can include information such as which RBs are used, which precoder is used, which power is used and any other information relevant to the functions described in this document.

A BS may further signal one or more of the following, e.g. upon request, or during certain conditions:
 The estimated pathgain or channel-measurements of the served UEs.
 The estimated pathgain for the served UEs to neighboring cells, using for exampled the reported RSRPs, other UE reports or uplink measurements.
 The estimated pathgain to UEs heard by the BS.
 The channel-measurements to UEs heard by the BS.
 The estimated decoding success of the served UEs (based on historic information)
 The decoding success of received transmissions from each UE (based on historic information).

Using the information signaled, each BS can know or estimate the following for each scheduled UE. The following part of the description is separated into the two cases where i) the scheduled UE is scheduled to receive data, i.e. downlink DL, and ii) when the scheduled UE is scheduled to transmit data, i.e. uplink UL:

When the Scheduled UE is Receiving Data, i.e. DL:
 $I_n$, the interference power experienced by the UE from BS n, where the interference can be estimated as:
  $I_n = g_n * P_n$, where $g_n$ is the effective channel including all estimated or known information such a precoder, receiver, number of antennas etc, and $P_n$ is the estimated transmission power for each transmitting antenna etc.
 S, the signal power received by the UE, which can be estimated as:
  $S = g*P$ where g is the effective channel including all estimated or known information such as e.g. precoder, receiver type, number of antennas etc, and P is the estimated transmission power for each transmitting antenna.
 N, the estimated noise power experience by the UE, including thermal noise, amplifier noise and all other source of noise including interference not explicitly estimated as $I_n$.

Using this data an estimated effective received SINR can be calculated as:

$S/(N+\Sigma I_n)$.

$$SINR = \frac{S}{N + \Sigma I_n}$$

Figure 2:
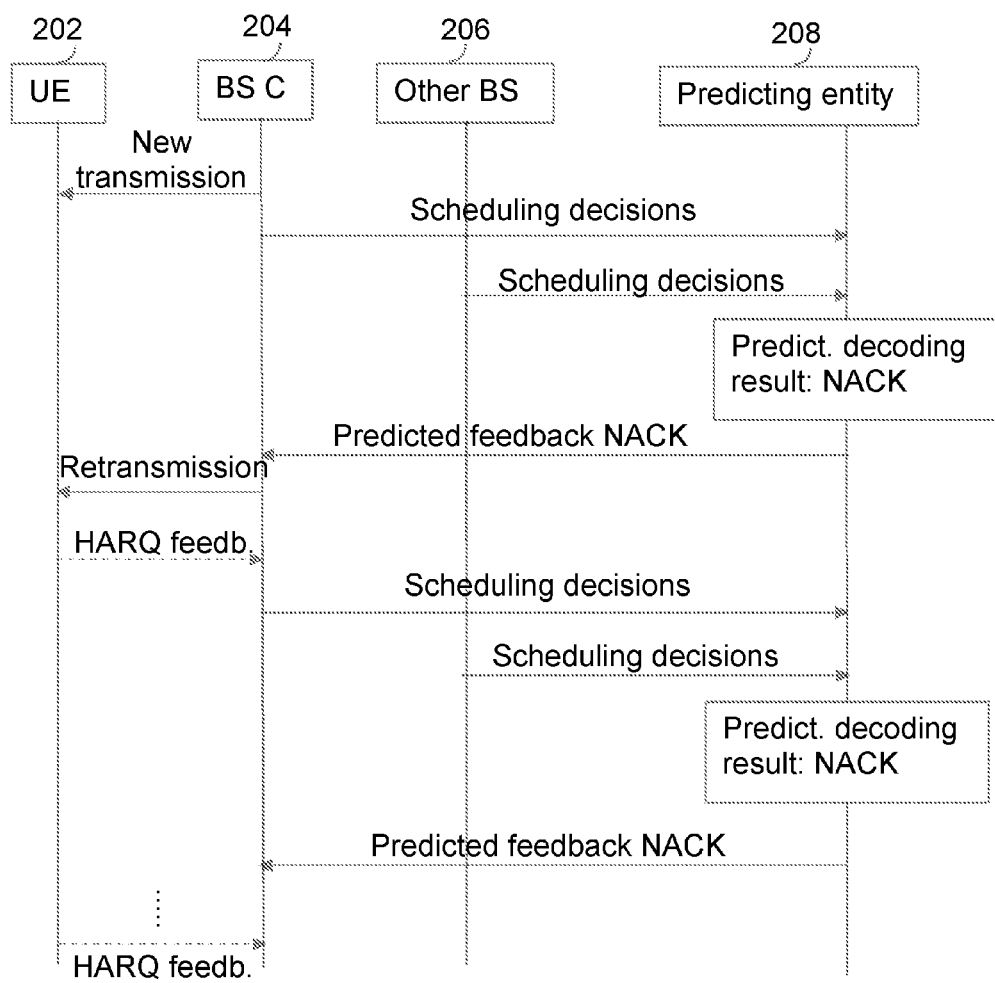
FIGS. 2 and 3 illustrate communication between nodes according to an exemplifying embodiment of the herein suggested method for supporting retransmission. The prediction entity 208, 310 is illustrated as a separate entity or node, but may alternatively be incorporated e.g. in BS C 204, 304, or BS B 306.

For each UE, of which the SINR has been calculated, the SINR can be mapped to a decoding success probability using known relations between SINR and BLEP (BLock Error Probability) and, possibly further using, knowledge of the UE implementation and the historic performance of the UE and the current amount of information that the UE is trying to decode and the amount of transmitted bits to the UE. Using the estimated decoding performance, a SINR threshold $SINR_{thr}$ can be defined such that $BLEP > BLER_{thr}$ for $SINR < SINR_{thr}$, where $BLER_{thr}$ is a BLock Error Rate threshold, such as a maximum allowed BLER. This predicts that with a certain probability the UE will fail the decoding and hence retransmission can be scheduled before receiving HARQ-feedback from the UE. The predicted performance may also be used to adapt the retransmission format. Signaling associated with this embodiment is illustrated in FIG. 2. In FIG. 2, the predicting entity 208 is illustrated as a separate entity or node, which is a possible alternative. However, the predicting entity could be comprised e.g. in the BS 204.

When the Scheduled UE is Transmitting Data, i.e. UL:
 Here, the reception of the UEs data is conducted in a point that does not need to coincide with the scheduling BS. For notation purposes we denote the receiving entity as the Pico, but the herein suggested technology is not only applicable when the receiving entity is a Pico base station.
 $I_n$, the interference power experienced by the Pico from UE n, where the interference can be estimated as:
  $I_n = g_n * P_n$, where $g_n$ is the effective channel including all estimated or known information such a precoder, receiver, number of antennas etc, and $P_n$ is the estimated transmission power etc.
 S, the received signal power which can be estimated as:

S=g*P where g is the effective channel including all estimated or known information such a precoder, receiver, number of antennas etc, and P is the estimated transmission power.

N, the estimated noise power experience by the Pico, including thermal noise, amplifier noise and all other source of noise including non-estimated interference.

Using this data an estimated effective received SINR can be calculated as:

$$S/(N+\Sigma I_n).$$

Figure 3:
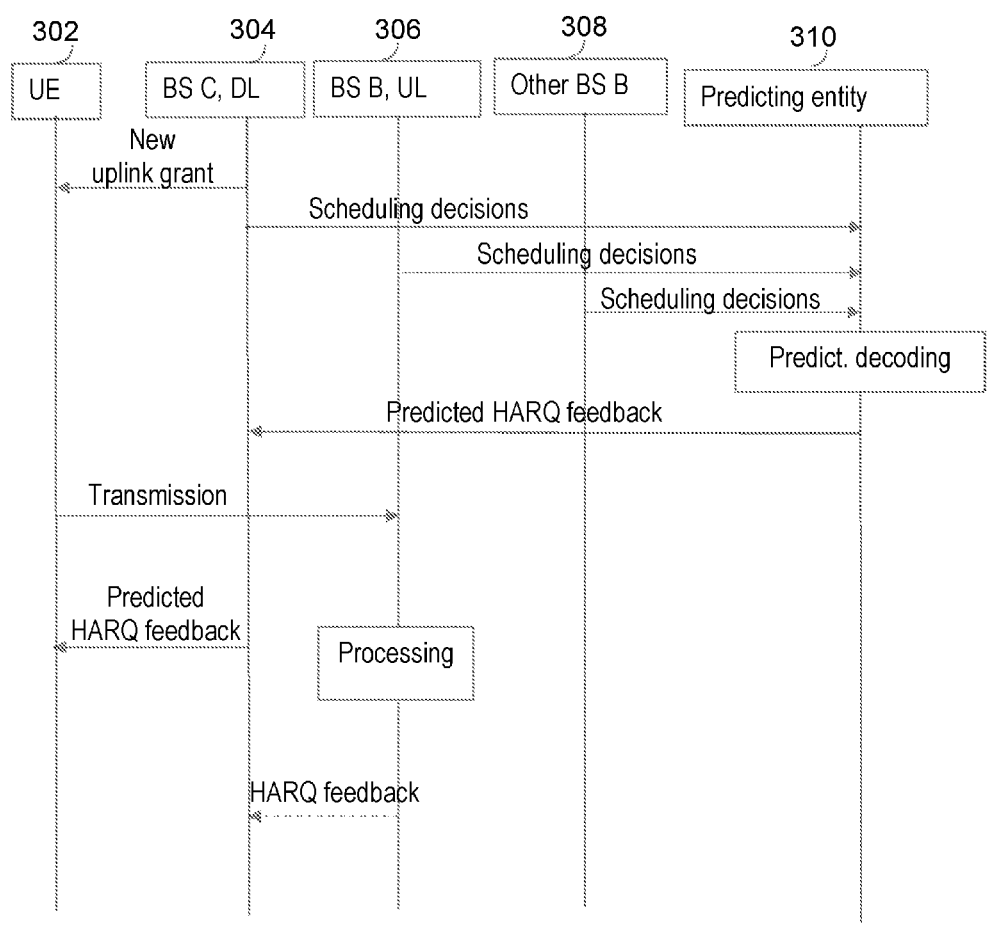

For each UE, of which the SINR has been calculated, the SINR can be mapped to a decoding success probability using know relations between SINR and BLEP and the knowledge of the Pico's implementation and the historic performance of the Pico and the current amount of information that the Pico is trying to decode and the amount of transmitted bits from the UE. Using the estimated decoding performance, a SINR threshold $SINR_{thr}$ can be defined such that BLER>$BLER_{thr}$ for SINR<$SINR_{thr}$. This predicts that with a certain probability the Pico will fail the decoding and hence we can transmit HARQ-feedback to the UE and schedule retransmissions from the UE without waiting for the Pico to decode and signal the reception success. Signaling associated with this embodiment is illustrated in FIG. 3. As above, the predicting entity 310 in FIG. 3 is illustrated as a separate entity or node, which is a possible alternative. The predicting entity 310 could, however, be comprised e.g. in the BS C 304.

Below, different exemplifying procedures arrangements will be described with reference to FIGS. 4-11. In order to help the understanding of the following description, certain terminology has been used, as follows:

Mobile terminal, or UE, "M", is a UE scheduled for communication in a radio resource, "R";

"BS C" is used for denoting the BS scheduling the UE "M". BS C may serve the UE

"M" in both UL and DL, or only in the DL;

"BS B" is used for denoting a BS not scheduling the UE "M". BS B could serve the UE "M" in the uplink, or not at all;

"Network node A" is used for denoting the network node comprising the previously described (cf. FIG. 1 b) predicting entity or arrangement for prediction 106. That is, network node A could be a BS C, a BS B, or some other network node, such as e.g. a management node and/or a control node.

Figure 4:
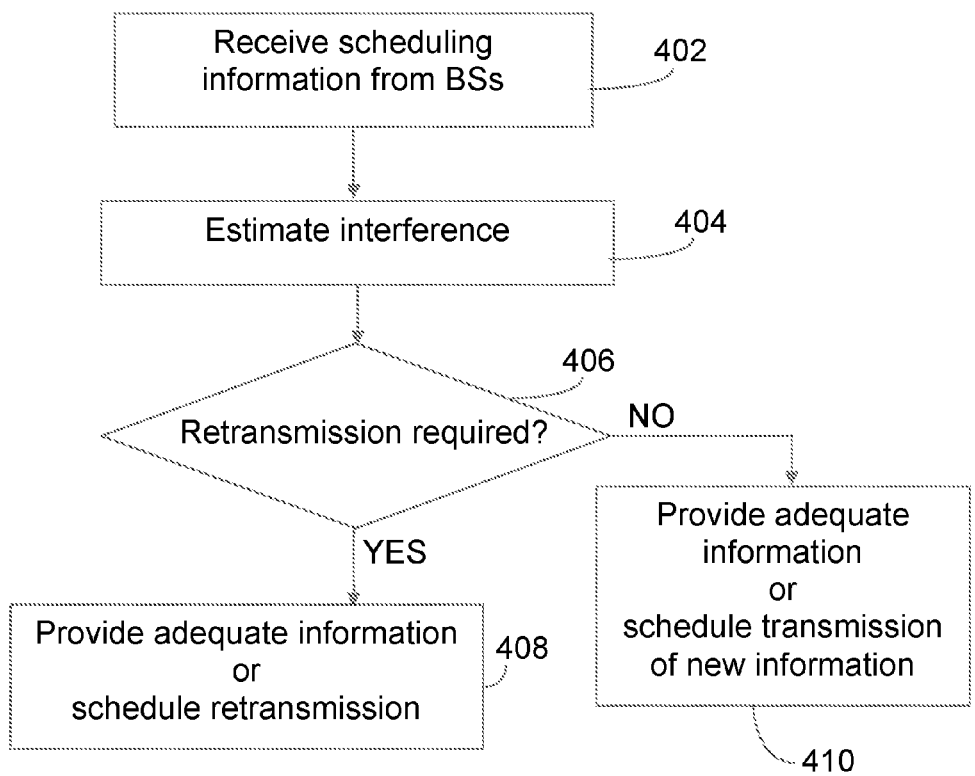
FIG. 4 is a flow chart illustrating actions of a procedure, according to an exemplifying embodiment. The procedure may be performed in a BS or another network node.
Figure 5:
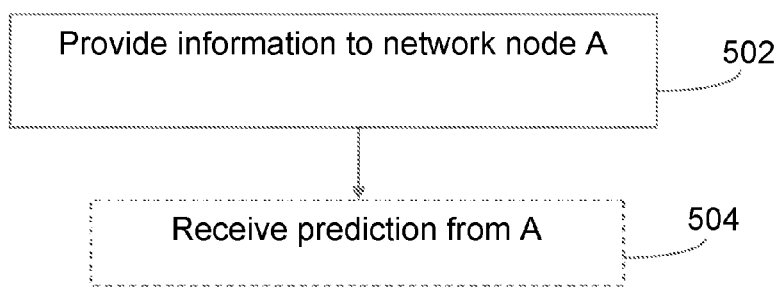
FIG. 5 is a flow chart illustrating actions of a procedure, according to an exemplifying embodiment. The procedure is performed in a BS.
Figure 6:
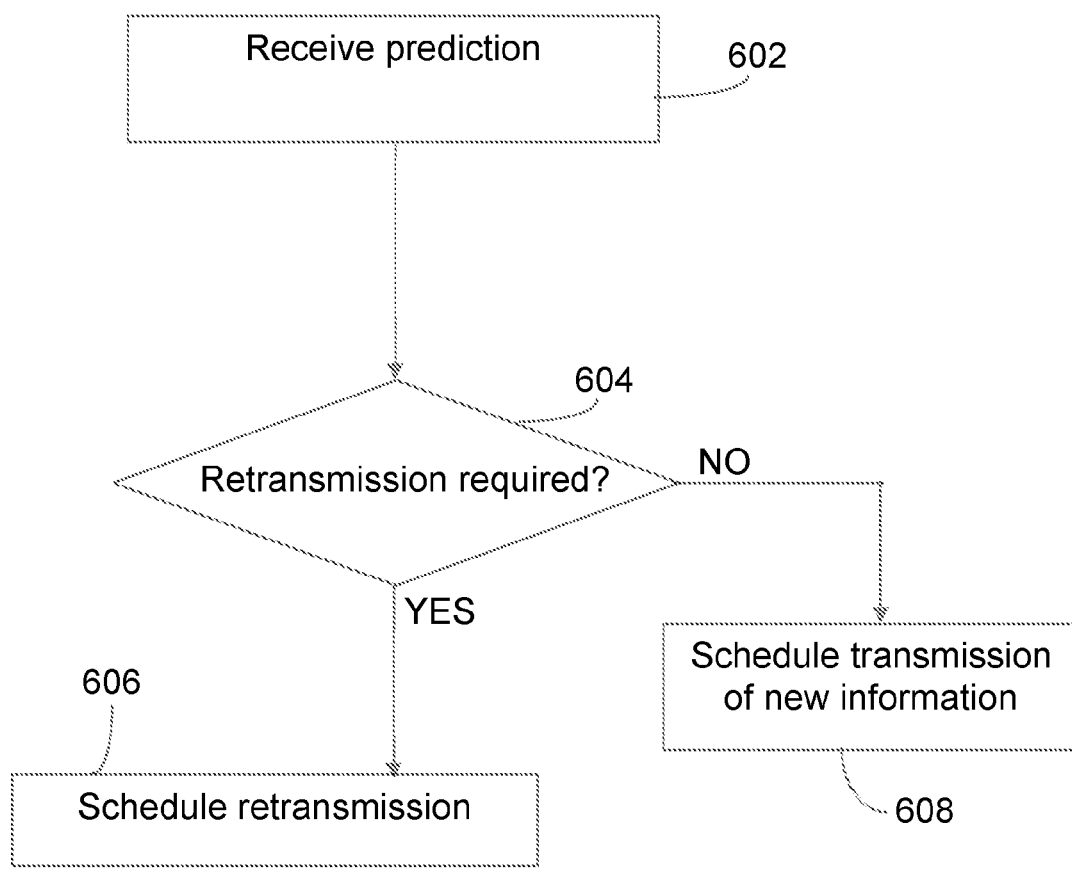
FIG. 6 is a flow chart illustrating actions of a procedure, according to an exemplifying embodiment. The procedure is performed in a BS.

Exemplifying Procedures, FIGS. 4-6

Below, exemplifying procedures for supporting retransmission in a communication system will be described with reference to FIGS. 4-6. The communication system is assumed to comprise a UE, "M", which is scheduled, by a serving BS "C", for uplink or downlink communication, in a radio resource R.

FIG. 4 illustrates an exemplifying procedure in a network node A. The network node A may be a BS or e.g. a control node somewhere in the network, as previously described. The actions of receiving and providing information in the procedure are slightly different, depending on in which node the method is to be performed.

Information on scheduling decisions associated with the radio resource R is received from at least one BS in an action 402. Information could be received from another BS than the BS C scheduling the UE M, e.g. a BS B. Further, the interference to the communication of the UE M in radio resource R is estimated in an action 404, based on the received information. It is predicted, in an action 406, whether a retransmission of the UE communication, i.e. the one in radio resource R, is required, based on the estimated interference and a predetermined criterion. For example, the predetermined criterion may involve, or relate to, a SINR (Signal to Interference and Noise Ratio) threshold value and/or a BLER (BLock Error Rate) threshold value, or other threshold value, representing a breakpoint between decoding success and decoding failure.

Then, adequate information may be provided or adequate action be taken in accordance with the prediction result. This is illustrated as actions 408 and 410 in FIG. 4.

In addition to scheduling information, further information may be received and be used for the prediction. Such additional or further information may be received from one or more of the at least one BS, from which the information on scheduling decisions associated with the radio resource R is received, but could alternatively, or in addition, be received from other BSs. For example, one or more of the following could be received from a BS: an estimated path gain or channel-measurements associated with a UE served by the BS; an estimated path gain to neighboring cells for a UE served by the BS; an estimated path gain to one or more UEs heard by the BS, i.e. from which one or more UEs signals can be received by the BS; channel-measurements to a UE heard by the BS; an estimated decoding success of a UE served by the BS; and a decoding success of transmissions received, by the BS, from a UE. The estimating of the interference may then be based on said additional information and the information on scheduling decisions associated with the radio resource R.

The predicting in action 406 may involve determining (not illustrated in FIG. 4) a decoding success probability for the UE communication in radio resource R based on the estimated interference. The predicting may then be based on the estimated decoding success probability and the predetermined criterion. The decoding success probability may be determined by estimating a SINR for the UE communication in radio resource R; and then mapping said SINR to a success probability using e.g. tabulated decoder performance. Such tabulated decoder performance is previously known and could be achieved through e.g. simulations or lab measurements.

When the method is performed by a BS serving and scheduling the UE M, action 408 could be to schedule a retransmission of the UE communication, i.e. the one previously scheduled in radio resource R. That is, a retransmission may be scheduled based on the prediction before actual, e.g. HARQ, feedback is received, indicating whether the communication scheduled in radio resource R was, in fact, received successfully or not. Accordingly, the action 410 could be to schedule transmission of new information instead of scheduling a retransmission, since it is predicted that a retransmission will not be required. Fallback positions may be configured, handling situations e.g. where the prediction has indicated that a retransmission will not be necessary, but later a HARQ NACK is received, indicating that a retransmission is required.

When the method described above is performed in a network node other than the BS scheduling communication to and/or from the UE M, actions 408 and 410 could be to provide the result of the prediction, or an indication thereof, to the base station scheduling the UE M, such that the scheduling BS may take appropriate action.

FIG. 5 illustrates actions that are taken in a BS other than the network node A. Primarily, information is provided to network node A in an action 502. This is scheduling information, and optionally the additional information described above. The BS may then receive a prediction, or an indication thereof, in an optional action 504, from the network node A, related to a radio resource for which information was provided in action 502. The network node could be the BS serving and scheduling the UE M, or e.g. a BS serving and scheduling other UEs.

FIG. 6 illustrates a procedure in a BS C, scheduling the UE M, but not comprising an arrangement for prediction 700 as described below in conjunction with FIG. 7. In this case, a prediction is received from a network node A in an action 602, which prediction is related to the radio resource R. Possibly, information related to the scheduling of UE M in radio resource R could have been previously provided to network node A. It is determined or identified in an action 604, whether the prediction indicates that a retransmission would be required, or not. Then, depending on whether a retransmission is required or not, a retransmission is scheduled in an action 606, or a new transmission is scheduled in an action 608. In case the retransmission or new transmission is concerning a BS, other than BS C, e.g. serving the UE M in the uplink, the scheduling decision of action 606 or 608 would be provided to said other BS.

Exemplifying Arrangements, FIGS. 7-10

Below, an example arrangement in a network node A 701, adapted to enable the performance of the above described procedure(s) for supporting retransmission will be described with reference to FIG. 7. The network node could be e.g. a BS or a control node in a communication system. The arrangement 700 is illustrated as to communicate with other entities via a communication unit 702 which may be regarded as part of the arrangement 700. The arrangement or network node may further comprise other functional units 716, such as e.g. functional units providing regular BS functions or control node functions, depending on the node in which the arrangement is located. The network node may further comprise one or more storage units 714.

The arrangement 700 could be implemented e.g. by one or more of: a processor or a micro processor and adequate software and memory for storing thereof, a Programmable Logic Device (PLD) or other electronic component(s) or processing circuitry configured to perform the actions described above.

The arrangement comprises a receiver 704, adapted to receive information on scheduling decisions associated with a radio resource R from at least one BS. The at least one BS providing the information does not need to know which radio resource(s) that is of interest for the receiver of the information. The arrangement in network node A may be assumed to have been provided with information on which radio resource (e.g. R) or resources that are to be evaluated, either from an entity within network node A, or from an entity or node outside network node A, such as an BS scheduling communication for the UE M. The arrangement 700 further comprises an estimating unit 706, adapted to estimate the interference to the communication of the UE in radio resource R based on said information. The arrangement further comprises a predicting unit 710, adapted to predict whether a retransmission of the UE communication is required, based on the estimated interference and a predetermined criterion. The predetermined criterion has been previously discussed above.

The arrangement 700 may further comprise a determining unit 708, adapted to determine a decoding success probability for the communication of the UE in radio resource R based on the estimated interference. The predicting unit would then be adapted to predict whether a retransmission of the UE communication is required based on the determined decoding success probability and the predetermined criterion.

The arrangement may further be adapted to estimate a signal to interference and noise ratio, SINR, for the UE communication in radio resource R; and to mapping said SINR to a success probability using e.g. tabulated decoder performance, as described above.

The arrangement 700 may optionally comprise a providing unit 712, adapted to provide e.g. the prediction of whether a retransmission of the UE communication is required, to another node or entity, when this is required and/or desired.

The arrangement 700 may further comprise a scheduler, adapted to schedule a retransmission of the UE communication when the prediction indicates that a retransmission is required. This would typically be when the network node A is a BS C which schedules the UE M. The scheduler is not illustrated in FIG. 7, but is illustrated in FIG. 8 as scheduler 814. Units 804-812 in FIG. 8 correspond to the previously described units 704-712. FIG. 8 illustrates the case where the arrangement for supporting retransmission is located in a BS C, which is the BS scheduling UE M. The BS C may also serve the UE M in downlink and/or uplink (cf. FIG. 1a showing different serving nodes for downlink and uplink).

Figure 9:
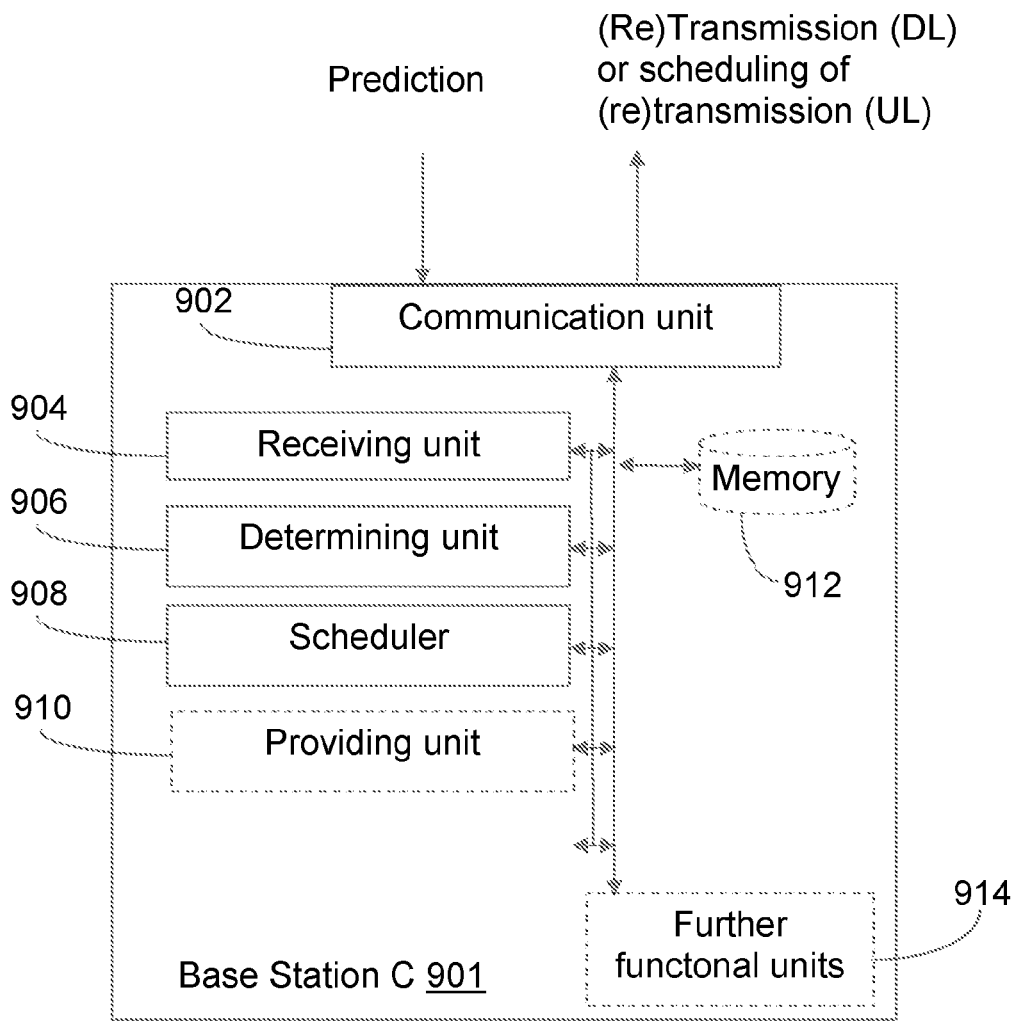
FIG. 9 is a block diagram illustrating an arrangement in a BS C, where the predicting entity is located in another node than BS C.

FIG. 9 illustrates the BS C, scheduling the UE M, in the case where the arrangement for prediction (cf. 700, 800 described above) is not located therein. In this case BS C would comprise a receiving unit 904, adapted to receive a prediction from a network node A, related to a radio resource R. Possibly, information related to the scheduling of UE M in radio resource R could have been previously provided to network node A. The BS C could comprise a determining unit 906, adapted to determine or identify whether the prediction indicates that a retransmission would be required, or not. Alternatively, such a function could be considered e.g. to be a part of the scheduler 908. The BS C would further comprise a scheduler 908, adapted to schedule a retransmission or new transmission depending on the prediction result, as previously described. In FIG. 9 BS C is further illustrated as to comprise an optional providing unit 910, adapted to provide e.g. information regarding communication of UE M to network node A and/or to provide scheduling decisions to UE M or another BS serving UE M.

Figure 10:
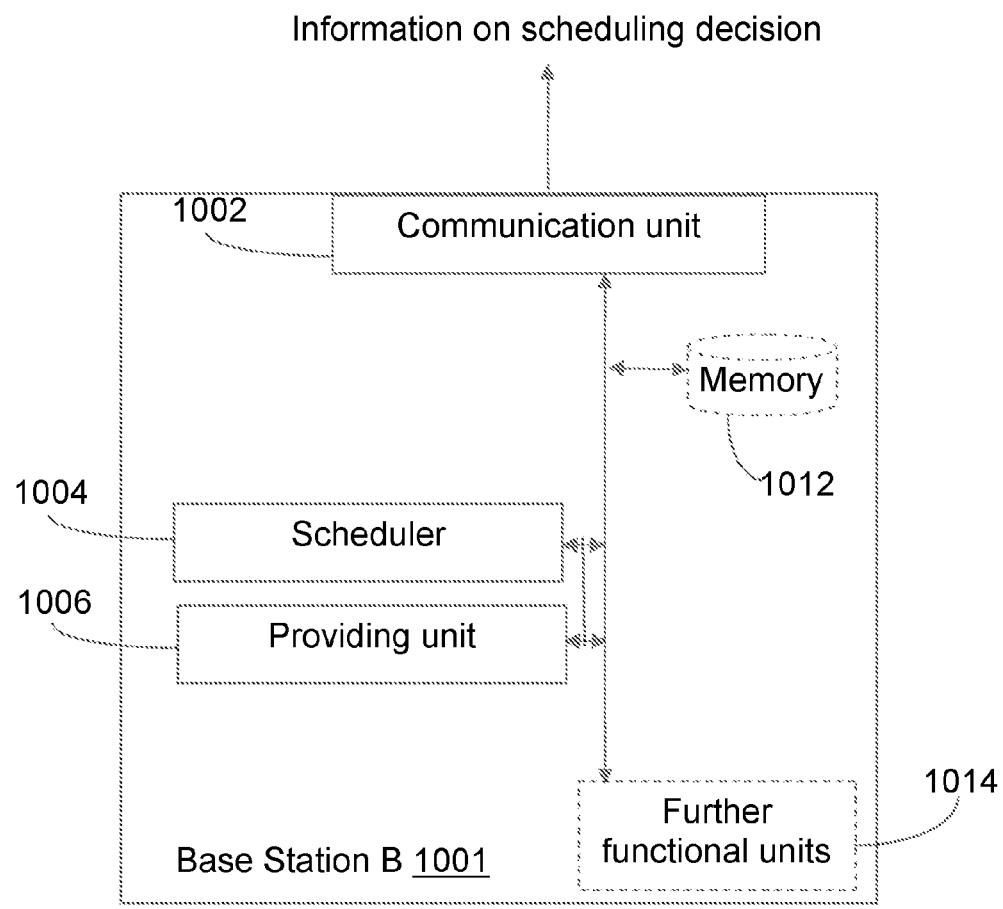
FIG. 10 is a block diagram illustrating an arrangement in a BS B, according to an embodiment.

FIG. 10 shows a BS B 1001, which does not schedule the UE M. The BS B comprises a scheduler 1004. BS B further comprises a providing unit 1006, adapted to provide information on scheduling decisions made by the BS B to the network node A. The providing of scheduling information and optionally other additional information as previously described, enables the network node A to estimate an interference to the communication of the UE M in radio resource R based on said information; and further to predict whether a retransmission of the UE communication is required, based on the estimated interference and a predetermined criterion. BS B 1001 is further illustrated as to comprise memory capacity 1012, providing storage, and further functional units 1014 for providing regular BS functionality.

Figure 11:
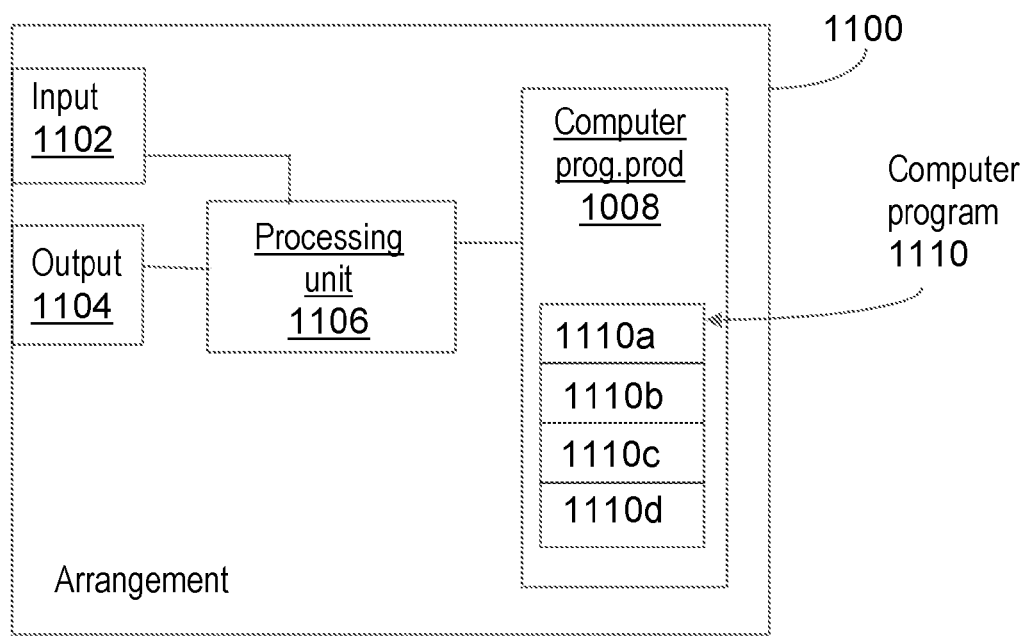
FIG. 11 is a block diagram illustrating an arrangement according to an embodiment.

Exemplifying Arrangement, FIG. 11

Figure 7:
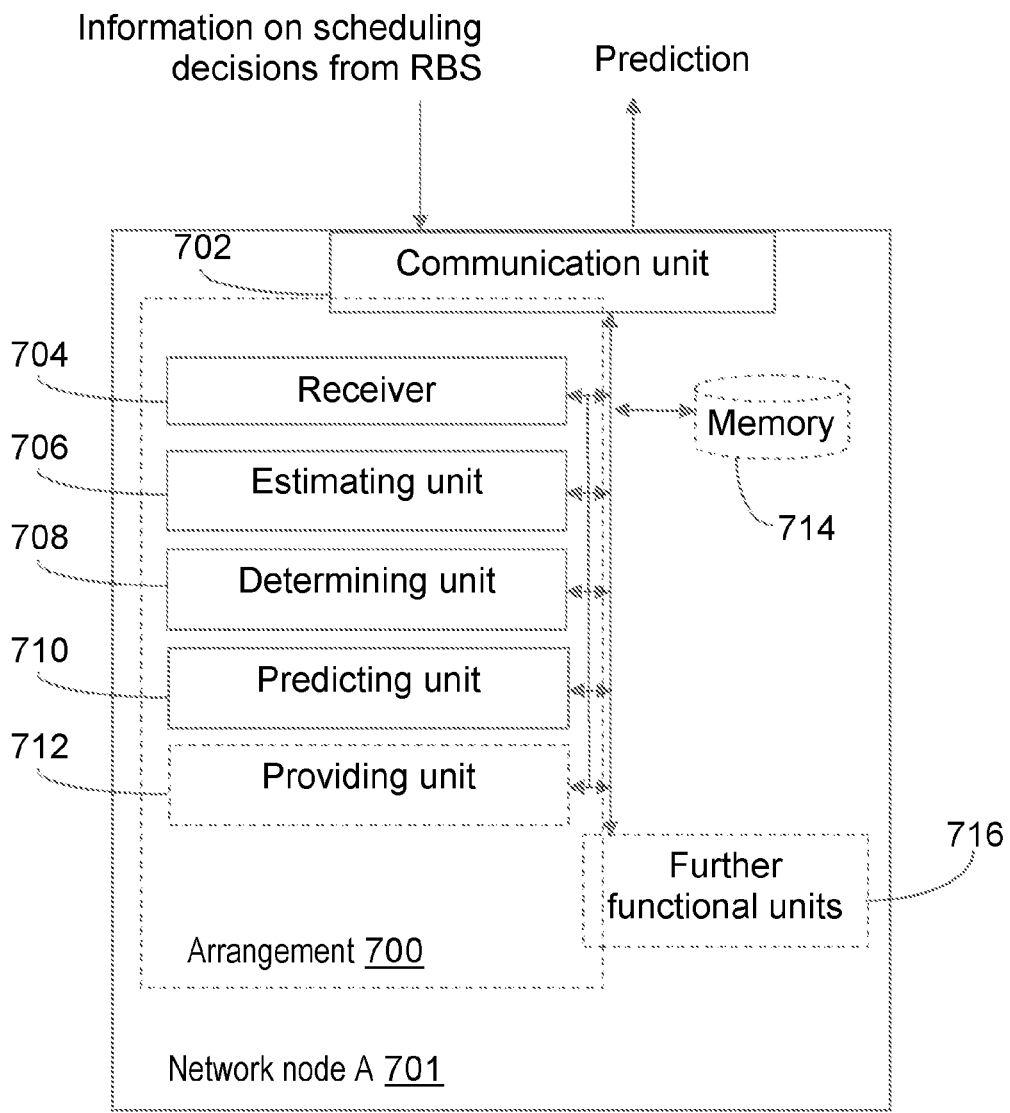
FIG. 7 is a block chart illustrating an arrangement in a network node A, according to an exemplifying embodiment.
Figure 8:
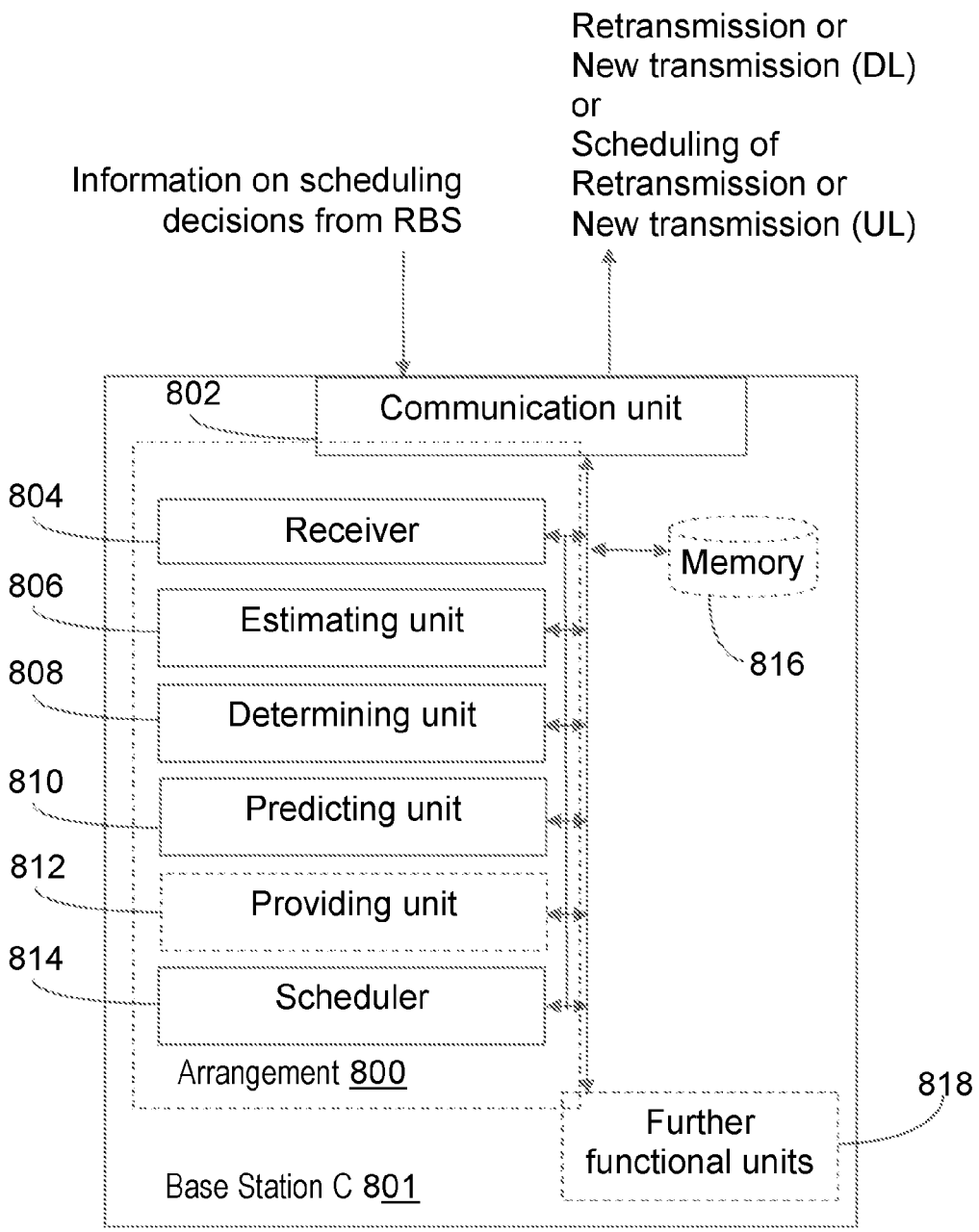
FIG. 8 is a block diagram illustrating an arrangement in a BS C, where the predicting entity is located in BS C.

FIG. 11 schematically shows a possible embodiment of an arrangement 1100 for prediction, which also can be an alternative way of disclosing an embodiment of the arrangements 700 or 800 illustrated in FIGS. 7 and 8. Comprised in the arrangement 1100 are here a processing unit 1106, e.g. with a DSP (Digital Signal Processor). The processing unit 1106 may be a single unit or a plurality of units to perform different actions of procedures described herein. The arrangement 1100 may also comprise an input unit 1102 for receiving signals from other entities, and an output unit 1104 for providing signals to other entities. The input unit 1102 and the output unit 1104 may be arranged as an integrated entity.

Furthermore, the arrangement 1100 comprises at least one computer program product 1108 in the form of a non-volatile memory, e.g. an EEPROM (Electrically Erasable Programmable Read-Only Memory), a flash memory and a hard drive. The computer program product 1108 comprises a computer program 1110, which comprises code means, which when executed in the processing unit 1106 in the arrangement 1100 causes the arrangement to perform the actions e.g. of the procedure described earlier in conjunction with FIGS. 7 and 8.

The computer program 1110 may be configured as a computer program code structured in computer program modules. Hence, in an exemplifying embodiment, the code means in the computer program 1110 of the arrangement 1100 comprises an estimating module 1110a for estimating the interference to a communication of a UE in a radio resource R based on received information. The computer program further comprises a predicting module 1110b for predicting whether a retransmission of the UE communication is required, based on the estimated interference and a predetermined criterion.

The computer program 1110 may further comprise e.g. a determining module 1110c for determining a decoding success probability for the communication of the UE in radio resource R. The computer program 1110 could further comprise other modules for providing other desired functionality, such as a receiving module 1110d.

The modules 1110a-d could essentially perform the actions of the flow illustrated in FIG. 4, to emulate the arrangement 700 or 800 illustrated in FIGS. 7 and 8.

Although the code means in the embodiment disclosed above in conjunction with FIG. 11 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as FPGAs (Field Programmable Gate Arrays) and/or ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

While the methods and arrangements for supporting retransmission, as suggested above, has been described with reference to specific embodiments provided as examples, the description is generally only intended to illustrate suggested technology and should not be taken as limiting the scope of the suggested methods and arrangements, which are defined by the appended claims. While described in general terms, the methods and arrangements may be applicable e.g. for different types of communication systems, using commonly available communication technologies using retransmission, such as e.g. WCDMA, LTE, LTE-A, WiMAX (Worldwide Interoperability for Microwave Access), GSM, UMTS, satellite systems or broadcast technologies. For example, as previously described, in this description, the term base station or BS could refer to an LTE-type base station (eNodeB/eNB), but could also refer e.g. to an RNC and/or a NodeB in an UMTS-type of system.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions. For example, the purpose of the labeling of the nodes/base stations as "A", "B", "C", "M", etc. is entirely to help the reader to separate the different nodes and their roles in the supporting of retransmission described herein.

It should also be noted that the units or modules described in this disclosure are to be regarded as logical entities and not with necessity as separate physical entities.

The invention claimed is:

1. A method performed by a network node A for supporting retransmission in a wireless communication system comprising a user equipment (UE) which is scheduled, by a base station (BS) C for communication in a radio resource R, said method comprising:
receiving information on one or more scheduling decisions associated with a scheduled communication associated with the radio resource R from at least one BS;
prior to transmission of the scheduled communication, estimating an interference to the scheduled communication based on the information on the one or more scheduling decisions;
prior to transmission of the scheduled communication, predicting whether a retransmission of the scheduled communication will be required, based on the estimated interference estimated based on the information and a predetermined criterion.

2. The method according to claim 1, wherein:
receiving the information, from the at least one BS comprises receiving on one or more of:
an estimated path gain or channel-measurements associated with a UE served by the BS;
an estimated path gain to neighboring cells for a UE served by the BS;
an estimated path gain to a UEs heard by the BS;
channel-measurements to a UE heard by the BS;
an estimated decoding success of a UE served by the BS; and
a decoding success of transmissions received, by the BS, from a UE; and
wherein the estimating of the interference is based on said information and the information on scheduling decisions associated with the radio resource R.

3. The method according to claim 1, wherein predicting whether the retransmission of the scheduled communication will be required comprises:
determining a decoding success probability for the scheduled communication based on the estimated interference, and predicting whether the retransmission of the scheduled communication will be required based on the estimated decoding success probability and the predetermined criterion.

4. The method according to claim 3, wherein determining the decoding success probability comprises:
estimating a signal to interference and noise ratio (SINR) for the scheduled communication in radio resource R; and
mapping said SINR to the decoding success probability using tabulated decoder performance.

5. The method according to claim 1 wherein the predetermined criterion involves at least one of a SINR threshold value and/or a block error rate (BLER), threshold value, representing a breakpoint between decoding success and decoding failure.

6. The method according to claim 1, wherein the network node A is the BS C serving the UE.

7. The method according to claim 6, further comprising:
when the prediction indicates that the retransmission of the scheduled communication will be required:
scheduling the retransmission of the scheduled communication.

8. The method according to claim 1, wherein the network node A comprises a computer readable code stored in a non-transitory computer-readable medium, the computer readable code operable when run in network node A to cause the network node A to perform the corresponding method according to claim 1.

9. A network node A operable in a wireless communication system comprising a user equipment (UE), which is scheduled, by a base station (BS) C, for communication in a radio resource R, said network node A comprising:
a receiver, adapted to receive information from the BS C, the received information comprising one or more scheduling decisions associated with a scheduled communication of the UE on the radio resource R,
an estimating unit, adapted to estimate an interference to the scheduled communication of the UE in the radio resource R prior to transmission of the scheduled communication, the estimate unit estimating the interference based on said information comprising the one or more scheduling decisions,
a predicting unit, adapted to predict, prior to transmission of the scheduled communication, whether a retransmission of the scheduled communication will be required, the predicting unit predicting the retransmission based on the interference estimated based on said information comprising the one or more scheduling decisions and a predetermined criterion.

10. A method performed by a Base Station (BS) B for supporting retransmission in a wireless communication system comprising a user equipment (UE) being scheduled, by a BS C, for communication in a radio resource R, the wireless communication system further comprising a network node A according to claim 9, said method comprising
providing information on one or more scheduling decisions made by the BS B to the network node A, the one or more scheduling decisions being associated with a scheduled communication in the radio resource R,
thus enabling the network node A to estimate, prior to transmission of the scheduled communication, an interference to the scheduled communication of the UE in the radio resource R based on said information; and further to predict, prior to transmission of the scheduled communication, whether a retransmission of the scheduled communication will be required, based on the estimated interference and a predetermined criterion.

11. The method according to claim 10, wherein:
providing the information on the one or more scheduling decisions comprises providing one or more of:
an estimated path gain or channel-measurements associated with a UE served by the BS B;
an estimated path gain to neighboring cells for a UE served by the BS B;
an estimated path gain to a UE heard by the BS B;
channel-measurements to a UE heard by the BS B;
an estimated decoding success of a UE served by the BS B; and
a decoding success of transmissions received, by the BS B, from a UE.

12. The network node according to claim 9, wherein the received information further comprises on one or more of:
an estimated path gain or channel-measurements associated with a UE served by the BS;
an estimated path gain to neighboring cells for a UE served by the BS;
an estimated path gain to a UEs heard by the BS;
channel-measurements to a UE heard by the BS;
an estimated decoding success of a UE served by the BS; and
a decoding success of transmissions received, by the BS, from a UE; and,
wherein the estimating of the interference is based on said information and the information on scheduling decisions associated with the radio resource R.

13. The network node according to claim 9, further comprising:
a determining unit, adapted to determine a decoding success probability for the scheduled communication of the UE in the radio resource R based on the interference estimated based on said information comprising the one or more scheduling decisions, and
wherein the predicting unit is adapted to predict whether the retransmission of the scheduled communication will be required based on the decoding success probability and the predetermined criterion.

14. The network node according to claim 13, wherein the determining unit is further operable to determine the decoding success probability by:
estimating a signal to interference and noise ratio (SINR) for the scheduled communication in the radio resource R; and
mapping said SINR to the decoding success probability using tabulated decoder performance.

15. The network node according to claim 9, wherein the predetermined criterion involves a SINR threshold value and/or a block error rate (BLER), threshold value, representing a breakpoint between decoding success and decoding failure.

16. The network node according to claim 9, wherein the network node A is the BS C, operable to serve and schedule the UE.

17. Network node according to claim 16, further comprising:
a scheduler, adapted to schedule a retransmission of the scheduled communication when the predicting unit determines that a retransmission will be required.

18. A Base Station (BS) B, operable in a wireless communication system comprising a user equipment (UE) being scheduled, by a BS C, for communication in a radio resource R, the wireless communication system further comprising a network node A according to claim 9, said BS comprising:
- a providing unit, adapted to provide information on one or more scheduling decisions made by the BS B to the network node A, the one or more scheduling decisions being associated with a scheduled communication in the radio resource R, thus enabling the network node A to estimate, prior to transmission of the scheduled communication, an interference to the scheduled communication of the UE in the radio resource R based on said information; and further to predict, prior to transmission of the scheduled communication, whether a retransmission of the scheduled communication will be required, based on the interference and a predetermined criterion.

19. The Base Station B, according to claim 18, wherein the information comprises one or more of:
- an estimated path gain or channel-measurements associated with a UE served by the BS B;
- an estimated path gain to neighboring cells for a UE served by the BS B;
- an estimated path gain to a UE heard by the BS B;
- channel-measurements to a UE heard by the BS B;
- an estimated decoding success of a UE served by the BS B; and
- a decoding success of transmissions received, by the BS B, from a UE.

* * * * *